United States Patent [19]

Antony et al.

[11] Patent Number: 5,714,851

[45] Date of Patent: Feb. 3, 1998

[54] SERIAL HYBRID DRIVE ARRANGEMENT FOR A MOTOR VEHICLE

[75] Inventors: Peter Antony, Lorch; Michael Buck, Winnenden, both of Germany

[73] Assignee: Mercedes-Benz AG, Germany

[21] Appl. No.: 591,082

[22] Filed: Jan. 25, 1996

[30] Foreign Application Priority Data

Jan. 25, 1995 [DE] Germany .................. 195 02 224.6

[51] Int. Cl.[6] ........................................ H02J 11/00
[52] U.S. Cl. .................. 318/148; 318/440; 318/500
[58] Field of Search ........................ 318/138, 140–158, 318/105–109, 500, 254, 439, 440–442; 307/82; 322/38, 39

[56] References Cited

U.S. PATENT DOCUMENTS

| | | | |
|---|---|---|---|
| 2,573,071 | 10/1951 | Storsand | 318/148 |
| 3,665,495 | 5/1972 | Carter et al. | 327/67 |
| 3,753,069 | 8/1973 | Newton | 318/440 |
| 3,805,139 | 4/1974 | Hoffman, Jr. et al. | 327/66 X |
| 4,007,407 | 2/1977 | Kranert | 318/147 |
| 4,119,861 | 10/1978 | Gocho | 290/13 |
| 4,712,054 | 12/1987 | Boldt | 318/758 |
| 4,772,829 | 9/1988 | Pickering et al. | 318/139 |
| 5,047,699 | 9/1991 | Rozman et al. | 318/254 |
| 5,309,073 | 5/1994 | Kaneko et al. | 318/500 |
| 5,504,414 | 4/1996 | Kinoshita | 320/15 |

FOREIGN PATENT DOCUMENTS

| | | |
|---|---|---|
| 25 14 987 | 1/1976 | Germany . |
| 40 00 678 | 7/1991 | Germany . |
| 43 22 676 | 1/1994 | Germany . |
| 43 31 569 | 3/1994 | Germany . |

OTHER PUBLICATIONS

Patent Abstract of Japan, 63-305705 dated Dec. 13, 1988.

Primary Examiner—Brian Sircus
Attorney, Agent, or Firm—Evenson, McKeown, Edwards & Lenahan,P.L.L.C.

[57] ABSTRACT

The invention provides a hybrid drive arrangement, particularly for a motor vehicle, having an internal combustion engine, a generator, a rectifier, an inverter, an energy accumulator connected to the direct current line between the rectifier and the inverter as well as a driving motor coupled to the inverter. A bypass line bridges the rectifier—direct-current line—inverter path, and a switching element is provided to couple the driving motor with the generator selectively by way of the rectifier—direct-current line—inverse rectifier path on the one hand, or the bypass line on the other.

4 Claims, 1 Drawing Sheet

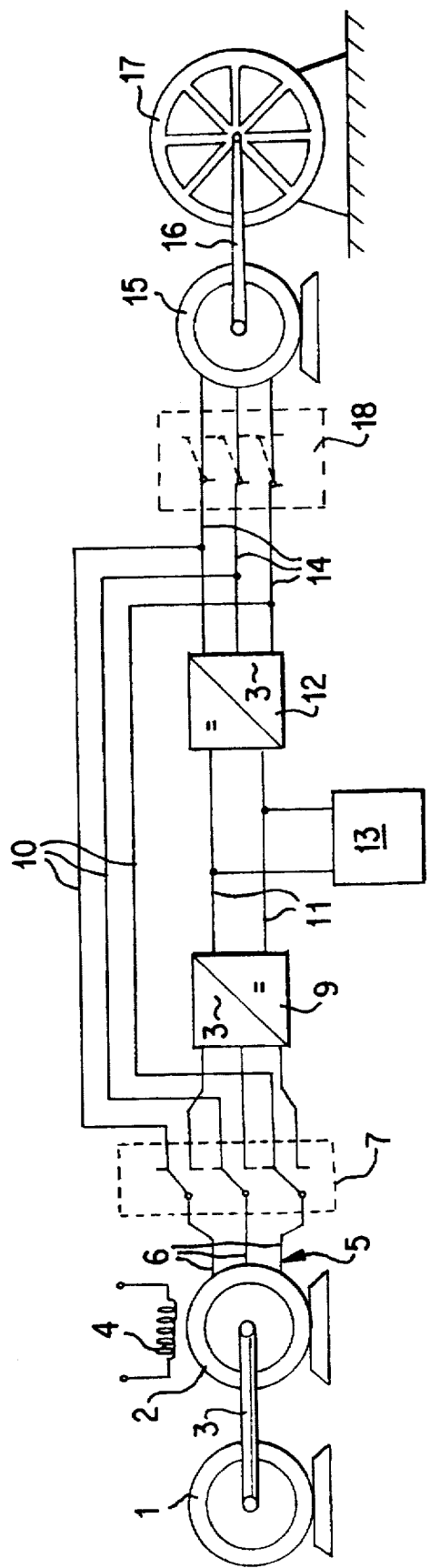

5,714,851

SERIAL HYBRID DRIVE ARRANGEMENT FOR A MOTOR VEHICLE

BACKGROUND AND SUMMARY OF THE INVENTION

This invention relates to a serial hybrid drive arrangement for a motor vehicle, which may be driven selectively by an internal combustion engine or by means of the energy stored in an energy accumulator.

When energy stored in an accumulator is used, driving takes place without any emissions, which is why this operating mode is frequently used for city driving. When the energy stored in the energy accumulator is no longer sufficient to drive the vehicle (for example, during long interstate driving and turnpike driving), a switch-over takes place to an internal combustion engine which is conventionally started by a separate starter. Energy generated by the internal combustion engine is controlled by a dynamically well regulating inverter, and is supplied to the driving electric motor as required, while any excess power can be used to charge the energy accumulator. Analogously, when the internal combustion engine power is too low to satisfy operational requirements, energy from the energy accumulator may also be used to drive the vehicle. Such serial hybrid drives are disclosed, for example, in Japanese Patent Document JP 63-305705 (A), and German Patent Documents DE 40 00 678 A1, DE 43 22 676 A1 and DE 43 31 569 A1, in which different types of energy accumulators are used, such as a superconducting coil, a flywheel or a battery.

U.S. Pat. No. 4,119,861 discloses a serial hybrid drive of the above-mentioned type which has a gas turbine engine. A bypass line is provided between the electric connection side of the generator and the output connections of a three pole switching element, whose input is connected with the outputs of an inverter. By operating the switching element, the input connections thereof may be connected either with the first output connections or with second output connections, the latter being connected with the connections of the driving electric motor. In the latter switching position, the energy of the gas turbine is transmitted to the driving motor in a customary manner by way of the generator, the rectifier, the direct-current line and the inverter. If there is excess energy, the battery serving as the energy accumulator is charged by the gas turbine or conversely, if the gas turbine power is too low, the driving motor can also be fed by the battery. In contrast, in the first-mentioned switching position, the driving motor is disconnected and the generator is connected with the battery by way of the inverter and the bypass line. This switching position is selected for starting the gas turbine engine, with the generator fed by the battery operating as an asynchronous starter motor.

Drive arrangements are also known in which the energy of an internal combustion engine is provided directly to a driving electric motor, by way of a generator and an electric connection line. See, for example, U.S. Pat. Nos. 2,573,071 and 4,007,407. Such direct-coupling drives without any power-regulating rectifier—direct-current line—inverter path are found mainly in ship and railway drive technology.

German Patent Document DE 25 14 987 A1 discloses a shunt connection activating system for pulse control of an electric driving motor of a motor vehicle in which an electronically controlled switching device is connected between the motor and a battery voltage source. A shunt contactor is switched in parallel with the switching device in order to prevent excessive heating of the electronic switching device at full power (that is, at pulse width repetition rates of the pulse control close to one), and to connect the maximum available voltage directly to the motor.

An object of the present invention is to provide a serial hybrid drive of the type mentioned above, which has a comparatively high efficiency and whose method of operation can be adapted to different drive requirements.

This and other objects and advantages are achieved by the hybrid drive arrangement according to the invention in which, by means of an arrangement of a bypass line and of a switching element, energy generated by the internal combustion engine (and converted in the generator) can be supplied to the driving motor in either of two ways: via the rectifier—DC line—inverter path on the one hand, or directly by way of the bypass line on the other. The former method of operation is particularly suitable for situations with a highly fluctuating drive load, because the inverter can be used to control the dynamics. In situations with a more constant drive load, however, a switch-over may take place to the bypass line, whereby energy is conducted directly from the generator to the driving motor, thereby avoiding losses in the rectifier, inverter and the DC line, and achieving improved driving efficiency. Thus, in these drive situations, the fuel consumption of the internal combustion engine can be reduced by several percent, typically between five and seven percent.

In addition, by means of this hybrid drive arrangement, emergency operation can be maintained if a defect occurs in the rectifier, in the inverter or in the DC line situated in-between, while using the bypass line. Because of the known efficiency behavior of internal combustion engines, emergency operation is more favorable the more uniform the drive load requirement. If the internal combustion engine has its own power control (for example, in the case of a motor vehicle, a throttle valve control), such emergency operation can also be performed satisfactorily in situations with certain load dynamics, such as in the case of a motor vehicle with different speeds and drive torques.

In a first embodiment, the switching element is connected between the generator and the rectifier, and the electric generator output can be connected with either the bypass line or the input side of the rectifier by means of the switching element. In contrast, in an alternative mirror-symmetrical second embodiment, the switching element is connected between the inverter and the electric driving motor.

The former arrangement has the advantage that, in the switching position in which the electric generator output is connected directly with the electric connection side of the driving motor by way of the bypass line, the energy accumulator is also connected with the bypass line by way of the inverter. On the one hand, this makes it possible to continue to operate the driving motor in an emergency mode in the event of a failure of the rectifier, specifically either by way of the internal combustion engine, the generator and the bypass line or by way of the battery and the inverter or in a mixed operation. In the latter case, energy generated by the constant power source formed by the internal combustion engine and the generator and provided by way of the bypass line is appropriately distributed by the inverter, so that energy not required for the driving motor is stored in the energy accumulator. Thus, also in this emergency operation, continuous power control of the driving motor can be achieved by means of the inverter. In addition, if the energy generated by the internal combustion engine is insufficient for driving in emergency operation the driving motor can also be operated by way of the inverter by the energy stored in the energy accumulator.

A further advantage of the first embodiment is that the permanent connection of the energy accumulator with the bypass line by way of the inverse rectifier makes it possible to start the internal combustion engine, at least in certain situations, without a separate starter, by using the energy of the energy accumulator. For this purpose, the switching position is selected in which the AC side of the inverter is connected directly with the generator by way of the bypass line. In this manner, the energy from the energy accumulator which is present on the AC side of the inverter is provided to the generator at least partially by way of the bypass line and the switching element. The generator thus operates as a starting motor for the internal combustion engine. In order to be able to function also as a starter motor, the generator may, for example, be designed as an independently excited synchronous machine with a corresponding polarity and setting of the excitation by the exciting winding. The omission of a separate starter saves weight and space, and also reduces cost.

In this embodiment, if an asynchronous motor is used as the driving motor, and it is connected to the AC side of the inverter, this starting procedure can be carried out only in driving operation and not when the driving motor is inoperative. The reason is that, to start the internal combustion engine, the inverter must generate a three-phase current frequency which rises to the minimum rotational starting speed of the internal combustion engine and which will then also exist at the driving motor. If the latter were held, it would reach its engine-caused breakdown torque and fail. Thus, the generator must be coupled directly with the driving asynchronous motor only by way of the triple switch if a minimum drive (that is, a minimum rotary frequency of the asynchronous motor) is reached. The desired starting moment can then be generated by the generator by way of voltage frequency control of the inverter and variable magnetization of the generator by means of the exciting winding. Expediently, this takes place by means of a power-balance-oriented control of the inverter so that it provides the power necessary to start of the internal combustion engine in addition to the power supplied to the driving asynchronous motor for the driving operation. In this manner, the vehicle maintains its speed during the starting operation while the driving conditions, such as the road topography and the tractive resistance remain the same.

When an independently excited synchronous machine is used as the driving motor, the foregoing limitations for starting the internal combustion engine do not exist. In this case, the internal combustion engine can also be started when the vehicle is inoperative. Only the exciting current of the independently excited synchronous machine acting as the driving motor must be set to zero during the starting operation so that, because of the lacking excitation, the driving motor will generate no drive torque.

In a further embodiment of the serial hybrid drive according to the invention, despite the use of an asynchronous motor as a driving motor, the internal combustion engine can be started, by the generator acting as a starter motor, without a separate starter, even when the vehicle is inoperative and the driving motor is therefore inoperative. For this purpose, during starting, the driving motor is disconnected from the bypass line and the inverter by shifting the two or three pole element, the additional switching element being connected into the AC path between the driving motor and the connection points of the bypass line thereto.

Other objects, advantages and novel features of the present invention will become apparent from the following detailed description of the invention when considered in conjunction with the accompanying drawings.

BRIEF DESCRIPTION OF THE DRAWINGS

The sole FIGURE shows a schematic block diagram of a serial hybrid drive according to the invention, which permits switchover to a direct coupling between the generator and the driving motor.

DETAILED DESCRIPTION OF THE DRAWING

The illustrated serial hybrid drive is particularly suitable for driving a motor vehicle, and has the following construction. A generator 2 (an independently excited synchronous machine with a schematically indicated exciting winding 4) is mechanically coupled to an internal combustion engine 1 by way of a shaft 3. A three-lead three-phase current line 6 connects the electric generator output 5 with the input of a controllable three-phase switch 7. The output of the switch 7 has two terminals for each lead of the three-phase current line, either of which terminals can be connected with a pertaining input connection. One group of output terminals is connected with the AC side of a rectifier 9, while the other group of output terminals is connected with the respective leads of a three-lead three-phase current bypass line 10. A DC line 11 connects the DC side of the rectifier 9, with the DC input side of an inverter 12, and with an energy accumulator in the form of a battery 13. A three-phase AC line 14 connects AC current side of the inverter 12 with an electric driving motor 15, which may be designed as an asynchronous machine. Alternatively, however, other three-phase motor types may also be used. An element to be driven is coupled to the driving motor 15 by way of a shaft 16. In the case of a motor vehicle, this element is the illustrated vehicle wheel 17. The end of the bypass line 10, which is opposite the switch 7, is coupled into the three-phase AC line 14 between the inverter 12 and the driving motor 15.

Except for the arrangement of the three-phase switch 7 and of the bypass line 10, the illustrated construction corresponds to that of a conventional serial hybrid drive. By means of the three-phase switch 7, it is possible to break the connection between the generator 2 and the rectifier 9 and to couple the three-phase connections 5 of the generator 2 directly to the three-phase current line 14 between the inverter 12 and the driving motor 15. The advantages resulting from this switch-over possibility will be discussed in detail in the following.

If the triple switch 7 is in the switching position connecting the rectifier 9 with the generator 2, the bypass line 10 is uncoupled and the function of the hybrid drive corresponds to that of conventional serial hybrid drives. The energy of the internal combustion engine 1 is converted by the generator 2 to a three-phase electric current, which in turn is transformed into direct current by the connecting rectifier 9. The DC line 11 supplies this DC current to the battery 13 on the one hand, and to the DC side of the inverter 12 on the other. The inverter 12 transforms the direct current back into three-phase current which is supplied to the driving motor 15 by way of the three-phase line 14. The driving motor 15 generates mechanical driving energy from this current.

Because of its inherent dynamic control characteristics, the inverter 12 permits an appropriate power distribution. When the energy provided by the internal combustion engine 1 is greater than required for driving, the excess is used to charge the battery 13. On the other hand, during operating phases in which the energy requirement is greater than the energy provided by the internal combustion engine 1, the battery 13 supplies energy to the driving motor 15 by way of the DC line 11 and the inverter 12. Therefore, depending on the situation, the internal combustion engine 1 by itself, the battery 13 by itself, or both together can produce the required driving power.

In the case of an essentially constant driving load (for example, during driving operation phases of a motor vehicle equipped with a hybrid drive at a steady-state speed, as during interstate and turnpike driving), conditions exist which permit direct electric coupling of the three-phase current generator 2 with the three-phase driving motor 15. In the case of a motor vehicle with a cruise control, such steady-state driving operation phases exist, for example, when driving takes place with an activated cruise control. To provide such a direct coupling between the generator 2 and the driving motor 15, the three-phase switch 7 is set so that the three-phase current outputs of the generator 2 are disconnected from the rectifier 9 and are connected to the bypass line 10. Energy is therefore transmitted from the internal combustion engine 1 by way of the generator 2 and the bypass line 10 directly to the driving motor 15. Bypassing of the rectifier 9, of the inverter 12 and of the DC line path 11 in this manner avoids the energy losses which would otherwise arise in these components, thereby achieving improved driving efficiency, and decreasing the fuel consumption for the internal combustion engine 1 by typically 5 to 7% in comparison to a conventional arrangement.

In addition, in the position of the three-phase switch 7 which activates the bypass line 10, the hybrid drive permits an emergency operation when the rectifier 9 fails, because the electric energy supplied at the generator 2 can then be transmitted by way of the bypass line 10 to the driving motor 15 independently of the operability of the rectifier 9. Taking into account the efficiency dependence of the internal combustion engine 1 on the driving load, the ideal application for this direct coupling, including emergency operation, is again when there are no larger fluctuations of speed and load. If the internal combustion engine 1 has a functioning throttle valve control, a driving operation with certain dynamics can also easily be carried out at different speeds and driving torques in such an emergency operation. In addition, it should be taken into account that, also in the case of this method of operation with an activated bypass line 10 and an uncoupled rectifier 9, energy can be supplied to the battery 13 by way of the inverter 12. In addition to such battery charging, this arrangement permits continuous power control for the driving motor 15 by means of the inverter 12. The combination of the internal combustion engine 1 and the generator 2 then operates as a constant power source, and the inverter 12 acts as a valve for distributing the energy from the bypass line 10 between the driving motor 15, on the one hand, and the battery 13 on the other hand, via the three-phase AC line 14. Furthermore, in the operation with an active bypass line 10 and an uncoupled rectifier 9, it is also always possible to supply energy from the battery 13 by way of the inverter 12 to drive the motor 15 as the sole driving energy source, while the internal combustion engine 1 is inactive or in addition to the energy supplied by this internal combustion engine 1.

The construction of the hybrid drive with the three-phase switch 7 and the bypass line 10 also makes it possible to omit a separate starter which is normally provided to start the internal combustion engine 1. That is, with the illustrated hybrid drive, the internal combustion engine 1 can be started by setting the three-phase switch 7 in the switching position which connects the three-phase current connection 5 of the generator 2 with the bypass line 10. In this manner, energy from the battery 13 is provided to the generator three-phase current side 5 by way of the inverter 12 and the bypass line 10. The internal combustion engine 1 can thus be started whenever the vehicle is being driven by the (traction) battery 13. In this starting operation, the generator 2, which receives three-phase energy from the AC side of the inverter 12 by way of the bypass line 10, operates as a starter motor. For this purpose, it is appropriately designed as an independently excited synchronous machine, with the polarity and setting of the excitation suitably selected by means of the exciting winding 4.

As mentioned above, when an asynchronous motor is used as the driving motor 15, starting of the internal combustion engine 1 by means of the generator 2 can be performed only when the vehicle drives at a certain minimum speed, and the driving motor 15 therefore has a specific minimum rotational speed if no other measures are taken. Preferably, such starting operation takes place by means of a power-balance-oriented control of the inverter 12, in which it continues to supply the driving motor 15 with the power provided before the starting operation and takes the power to be supplied to the generator 2 for the starting of the internal combustion engine 1 additionally from the battery 13. When an independently excited synchronous machine is used as the driving motor 15, the internal combustion engine can be started without any problems even when the vehicle is inoperative, since the exciting current for the independently excited synchronous machine is kept at zero during the starting operation.

When an asynchronous motor is used as the driving motor 15, in order to permit the starting of the internal combustion engine 1 by means of the generator 2 as a starter motor without a separate starter, optionally the electric connection side of the driving motor 15 may be galvanically uncoupled from the inverter 12 and the bypass line 10. Such a measure is illustrated in the figure by means of a broken line in the form of a three pole switch 18 which, for this purpose, is to be inserted in the three-phase AC line 14 between the inverter 12 and the driving motor 15. More precisely, it is provided between the connection points of the bypass line 10 to the three-phase current line 14 and the electric connection side of the driving motor 15. Instead of the illustrated three pole switch 18, a two pole switch would also be sufficient, by means of which two of the three phases of the three-phase AC line 14 can be interrupted simultaneously. If the internal combustion engine 1 is to be started during a vehicle stoppage by way of the generator 2, this switch 18 is switched from the position illustrated in the figure, in which it does not interrupt the three-phase current line 14, into an open position in which the three (or two of the) three-phase current connections of the driving motor 15 are disconnected. Then, as described above for the starting operation in the driving condition, the inverter 12 can take the necessary starting energy from the battery 13 and with an appropriate three-phase current frequency rise, supply it to the generator by way of the bypass line 10 so that this generator 2 can start the internal combustion engine 1.

To control the individually illustrated hybrid driving components for the purpose of implementing the described different modes of operation and functions, a corresponding drive control (not shown) is provided, whose implementation can be carried out by a person skilled in the art, as can the various modifications of the above-described hybrid drive within the scope of the invention. Thus, the use of the hybrid drive is not limited to motor vehicles but may also be considered wherever an element is to be mechanically driven by means of a hybrid drive. It is also understood that, when the hybrid drive is used in a motor vehicle, not only the one wheel 17 shown as an example but at least also a possibly existing same-axle wheel or also four driving wheels can be driven by the hybrid drive, in which case, for example, instead of the one illustrated driving motor 15, a separate wheel hub motor may be provided for each wheel. These wheel hub motors may be connected in parallel to the alternating current side of a common inverter 12.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A hybrid drive arrangement comprising:

a combustion engine;

a generator mechanically coupled to the combustion engine;

a rectifier having an AC input which can be electrically coupled to the generator;

an inverter having a DC input connected to the rectifier by way of a DC line;

an energy accumulator connected to the DC line;

an electric motor which can be electrically coupled with an AC output of the inverter by a three-phase line and to which a movable element, which is to be driven, can be mechanically coupled;

a bypass line arranged between an electric output of the generator and an input of the driving motor; and a switching element for selectively connecting the output of the generator to the input of the driving motor by way of the rectifier, the DC line and the inverter in a first switching position, and by way of the bypass line in a second switching position.

2. A hybrid drive arrangement according to claim 1, wherein the switching element has input connections and first and second groups of output connections, output connections in said first group being connected with said input connections in the first switching position, and output connections of said second group being connected with said input connections in the second switching position, the input connections of the switching element being connected to the output of the generator and the output connections of the first group being connected with the alternating current side of the rectifier, while the bypass line is connected at one end thereof to the output connections of the second group, with the other end thereof being coupled to the alternating current path between the inverter and the driving motor.

3. A hybrid drive arrangement according to claim 1, wherein the switching element has input connections and first and second groups of output connections, output connections in said first group being connected with said input connections in the first switching position, and output connections of said second group being connected with said input connections in the second switching position, the input connections of the switching element being connected to an input of the driving motor and the output connections of the first group being connected with the AC output of the inverter, while the bypass line is connected at one end thereof to the output connections of the second group, with the other end thereof being coupled to an AC line between the generator and the rectifier.

4. A hybrid drive according to claim 1, wherein
   the driving motor comprises an independently excited synchronous machine; and
   a two or three pole switching element is arranged in a three-phase AC line connecting the inverter and the driving motor, between a connection point of the bypass line and the input of the driving motor, the switching element, in a first controllable switching position, not interrupting the three-phase AC line, and in a second controllable switching position, interrupting at least two phases of the three three-phase AC line.

* * * * *